UNITED STATES PATENT OFFICE.

FRIEDRICH RUNKEL, OF ELBERFELD, GERMANY, ASSIGNOR TO THE FARBENFABRIKEN, VORMALS FR. BAYER & CO., OF SAME PLACE.

BLUE-GREEN DYE.

SPECIFICATION forming part of Letters Patent No. 541,572, dated June 25, 1895.

Application filed October 29, 1894. Serial No. 527,370. (Specimens.) Patented in Germany August 14, 1891, No. 63,743.

*To all whom it may concern:*

Be it known that I, FRIEDRICH RUNKEL, doctor of philosophy, a subject of the Emperor of Germany, residing at Elberfeld, Prussia, Germany, (assignor to the FARBENFABRIKEN, VORMALS FR. BAYER & CO., of Elberfeld,) have invented a new and useful Improvement in the Manufacture of Bluish-Green Dyes, (for which the aforesaid FARBENFABRIKEN, VORMALS FR. BAYER & CO., have already obtained Letters Patent in Germany, No. 63,743, dated August 14, 1891;) and I do hereby declare the following to be an exact and clear description of my invention.

My invention relates to the production of a bluish-green dye-stuff of the triphenylmethane series by condensing one molecular proportion of dialkyldiamidobenzhydrol with one molecular proportion of para nitrotoluene and subsequently oxidizing the so formed leuco compound which dye is very fit for dyeing and printing purposes.

In carrying out my invention practically I proceed, for example, as follows: Fifty-four parts, by weight, of tetramethyldiamidobenzhydrol are mixed with 27.4 parts, by weight, of para nitrotoluene and gradually stirred into three hundred and twenty-five parts, by weight, of monohydrated sulfuric acid, taking care that the temperature of the mixture does not surpass 50° centigrade during this operation. The whole mixture thus obtained is heated at about 95° centigrade, until the whole quantity of tetramethyldiamidobenzhydrol employed has entered into reaction. The end of the condensation is distinguishable by the fact that a test portion taken out from the sulfuric acid mixture when dissolved in water, yields no longer the blue color of tetramethyldiamidobenzhydrol on the addition of sodium acetate and a large excess of glacial acetic acid to the said acid watery solution. When this point is arrived at the above mixture is stirred into water and this liquid is filtered, in order to remove the small quantity of an insoluble residue. The resulting filtrate, which contains the leuco base produced is mixed at first with nine hundred and eighty parts, by weight, of soda-lye (32° Baumé) and finally with a solution of sodium carbonate in water the leuco base being thus precipitated as a darkish-yellow colored crystalline mass, which is filtered off, washed and dried. This leuco product probably possesses the following formula:

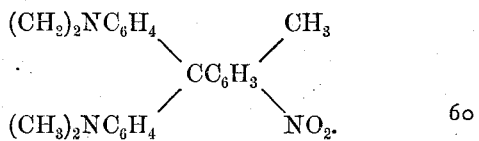

In order to oxidize the so-formed leuco base, 38.9 parts, by weight, of this base are dissolved in 36.5 parts, by weight, of hydrochloric acid (thirty per cent.) with the addition of fifteen hundred parts, by weight, of water. To this solution 159.5 parts, by weight, of a lead dioxid paste (containing fifteen per cent. of lead dioxid) are added on continuous stirring. After some time the oxidation is completed and the lead is precipitated by means of sodium sulfate. After filtering off from the lead sulfate the dye-stuff is precipitated by adding sodium chlorid and zinc chlorid to the filtrate. The dye-stuff, which is a zinc chlorid double salt, containing the oxidation product

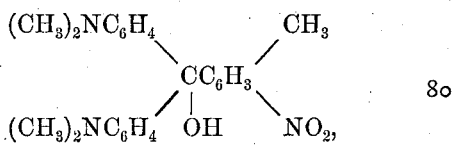

is filtered off, pressed and finally dried at about 45° centigrade. It forms, when pulverized, a dark powder with metallic luster, easily soluble in water and alcohol with a greenish-blue color. When mixed with ammonia liquor it is dissolved at first in a slight degree and after some time a greenish-white precipitate is formed being the color base of the dye-stuff. By concentrated sulfuric acid (66° Baumé) the dye-stuff is dissolved with a yellow color which is not altered on the addition of a small quantity of ice-water to the above sulfuric acid solution. The dye-stuff produces on mordanted cotton and also on silk clear greenish-blue shades of great fastness to the action of alkali and it is likewise suitable for printing purposes.

Having now described my invention and in what manner the same may be performed, what I claim as new, and desire to secure by Letters Patent, is—

1. The process for the production of a greenish-blue dye-stuff belonging to the triphenylmethane series by condensing one molecular proportion of tetraalkyldiamidobenzhydrol with one molecular proportion of para nitrotoluene and subsequently oxidizing the so formed leuco product in the manner hereinbefore described.

2. As new article of manufacture the greenish-blue dye-stuff which may result from one molecular proportion of tetramethyldiamidobenzhydrol and one molecular proportion of para nitrotoluene by condensation and subsequent oxidation forming when dried and pulverized a dark powder with metallic luster, easily soluble in water and alcohol with a greenish-blue color, soluble in concentrated sulfuric acid (66° Baumé) with a yellowish-color, which is not altered on the addition of a small quantity of ice-water to the sulfuric acid solution, soluble in a slight degree in ammonia liquor the color base of the dye-stuff being precipitated after a short time in greenish-white flakes, producing on cotton mordanted with tannin and on silk clear greenish-blue shades and also being suitable for printing purposes.

In testimony whereof I have signed my name in the presence of two subscribing witnesses.

FRIEDRICH RUNKEL.

Witnesses:
R. E. JAHN,
F. H. STRAUSS.